United States Patent van Doorn et al.

Patent Number: 5,177,044
Date of Patent: Jan. 5, 1993

[54] CATALYST COMPOSITIONS

[75] Inventors: Johannes A. van Doorn; Johannes J. M. Snel; Peter A. A. Klusener, all of Amsterdam, Netherlands

[73] Assignee: Shell Oil Company, Houston, Tex.

[21] Appl. No.: 795,154

[22] Filed: Nov. 20, 1991

[30] Foreign Application Priority Data

Dec. 6, 1990 [NL] Netherlands ................. 9002688

[51] Int. Cl.$^5$ ............................. B01J 31/04
[52] U.S. Cl. ................ 502/162; 502/166; 502/167; 502/170; 528/392
[58] Field of Search ............ 502/162, 170, 166, 167

[56] References Cited

U.S. PATENT DOCUMENTS

| | | | |
|---|---|---|---|
| 4,818,810 | 4/1989 | Drent | 528/392 |
| 4,831,114 | 5/1989 | Drent | 502/162 X |
| 4,835,250 | 5/1989 | Drent | 528/392 |
| 4,843,144 | 6/1989 | Van Broekhoven et al. | 528/392 |
| 4,880,903 | 11/1989 | Van Broekhoven et al. | 528/392 |
| 4,935,396 | 6/1990 | Van Doorn et al. | 502/162 X |
| 4,960,747 | 10/1990 | Van Doorn et al. | 502/162 X |

*Primary Examiner*—Patrick P. Garvin

[57] ABSTRACT

A novel catalyst composition containing a Group VIII metal and a phosphorus bidentate ligand wherein each phosphorus atom forms part of a phosphacyclohexyl structure.

17 Claims, No Drawings

CATALYST COMPOSITIONS

FIELD OF THE INVENTION

The invention relates to novel catalyst compositions suitable for use in the preparation of polymers of carbon monoxide with one or more olefinically unsaturated compounds.

BACKGROUND OF THE INVENTION

Linear polymers of carbon monoxide with one or more olefinically unsaturated compounds are made up of the polymer units from carbon monoxide on the one hand and the units from the olefinically unsaturated compounds on the other hand which are present in a substantially alternating arrangement. These polymers can be prepared by contacting the monomers at elevated temperature and pressure with a catalyst composition containing a Group VIII metal and a phosphorus bidentate ligand with the general formula $(R_1)_2P$-R-$P(R_1)_2$ in which $R_1$ represents an optionally polar substituted monovalent hydrocarbon group, and R is a divalent organic bridging group containing three or four atoms, of which at least two are carbon atoms, which connects the two phosphorus atoms with each other. Both cyclic and acyclic groups may be used as $R_1$ groups. An example of a phosphorus bidentate ligand in which the $R_1$ groups possess a cyclic structure is 1,3-bis(diphenylphosphino)propane. As an example of a phosphorus bidentate ligand in which the $R_1$ groups possess an acyclic structure, 1,4-bis(di n-butylphosphino)butane can be mentioned.

During an investigation recently carried out by the applicant into the preparation of the above-mentioned alternating polymers, it was found that the number of atoms in the bridge connecting the two phosphorus atoms of the bidentate ligand with each other has a large influence on the polymerization activity of the catalyst compositions. For example, it was found that in the polymerization of carbon monoxide with ethene and/or with one or more α-olefins with at least three carbon atoms per molecule (designated herein as $C_{3+}$ α-olefins) using a catalyst composition containing a tetra-aryl bisphosphine, a sharp decrease in the polymerization activity occurred if a bisphosphine with three atoms in the bridge was replaced by one with four atoms in the bridge. A corresponding decrease of the polymerization activity was observed if, in the polymerization of carbon monoxide with ethene using a catalyst composition containing a tetra-alkyl bisphosphine, a bisphosphine with three atoms in the bridge was replaced by one with four atoms in the bridge. In complete contrast with this, it was found that in the polymerization of carbon monoxide with one or more $C_{3+}$ α-olefins and optionally also with ethene using a catalyst composition containing a tetra-alkyl bisphosphine, a sharp increase in the polymerization activity occurred if a bisphosphine with three atoms in the bridge was replaced by one with four atoms in the bridge.

In the course of continued research by the applicant into this subject, a class of diphosphorus compounds has now been found which have shown themselves to be ideally suited, together with a Group VIII metal, for use in catalyst compositions intended for the preparation of the above-mentioned alternating polymers. In contrast with the previously mentioned bisphosphines with the general formula $(R_1)_2P$-R-$P(R_1)_2$ in which either two cyclic groups or two acyclic groups occurred at each of the phosphorus atoms as $R_1$ groups, in the present diphosphorus compounds each of the phosphorus atoms forms part of a separate monocyclic structure in which a phosphorus atom occurs together with five carbon atoms. The present diphosphorus compounds can be represented by the general formula X-R-X in which X represents a phosphacyclohexyl group which is connected via the phosphorus atom with a carbon atom of the bridging group R, and R has the previously indicated meaning.

It was found during the investigation that the catalyst compositions which contained a diphosphorus compound with the general formula X-R-X exhibited the same special behavior with the number of atoms in the bridge as the catalyst compositions which contained a tetra-alkyl bisphosphine. On replacing in the catalyst composition a diphosphorus compound with three atoms in the bridge by one with four atoms in the bridge, a sharp decrease in the polymerization activity takes place if the catalyst composition is used for the polymerization of carbon monoxide with ethene, while such a replacement leads to a sharp increase in the polymerization activity if the catalyst composition is used for the polymerization of carbon monoxide with one or more $C_{3+}$ α-olefins and optionally also with ethene. It was further found in the investigation that the catalyst compositions containing a diphosphorus compound with the general formula X-R-X in which the bridge contains four atoms also displayed an exceptionally high polymerization activity when used for the polymerization of carbon monoxide with ethene and with a $C_{30+}$ α-olefin, bearing in mind the polymerization activities of these catalyst compositions in the polymerization of carbon monoxide with ethene or with the relevant $C_{3+}$ α-olefin.

As well as for the preparation of alternating polymers of carbon monoxide with ethene and/or with one or more $C_{3+}$ α-olefins, the catalyst compositions which contain a Group VIII metal and a diphosphorus compound with the general formula X-R-X can also be used for the preparation of alternating polymers of carbon monoxide with other olefinically unsaturated compounds.

A novel catalyst composition which contains a Group VIII metal and a diphosphorus compound with the general formula X-R-X, where R is a divalent organic bridging group and this bridge connecting the two phosphorus atoms present in the diphosphorus compound with each other allows for the diphosphorus compound to contain three or four atoms of which at least two are carbon atoms, and X represents a phosphacyclohexyl group which is connected via the phosphorus atom to a carbon atom of the bridging group R.

SUMMARY OF THE INVENTION

The present invention therefore relates to novel catalyst compositions which contain a Group VIII metal and a diphosphorus compound with the general formula X-R-X. The patent application further relates to the use of these catalyst compositions in the preparation of polymers of carbon monoxide with one or more olefinically unsaturated compounds, as well as to the polymers thus prepared and to shaped objects consisting at least partly of these polymers.

In this specification, Group VIII metals are understood to be the noble metals ruthenium, rhodium, palladium, osmium, iridium and platinum, as well as the iron group metals iron, cobalt and nickel.

DETAILED DESCRIPTION OF THE INVENTION

In the catalyst compositions according to the invention the Group VIII metal is preferably chosen from palladium, nickel and cobalt. Palladium is particularly preferred as the Group VIII metal. The incorporation of a Group VIII metal in the catalyst compositions preferably takes place in the form of a salt of a carboxylic acid, in particular in the form of an acetate. In addition to a Group VIII metal and a diphosphorus compound, the catalyst compositions according to the invention preferably also contain an anion of an acid with a pKa of less than 4 and in particular an anion of an acid with a pKa of less than 2. Examples of acids with a pKa of less than 2 are mineral acids such as sulphuric acid and perchloric acid, sulphonic acids such as methanesulphonic acid, trifluoromethanesulphonic acid and para-toluenesulphonic acid, and halocarboxylic acids such as trichloroacetic acid, difluoroacetic acid and trifluoroacetic acid. A sulphonic acid such as para-toluenesulphonic acid or a halocarboxylic acid such as trifluoroacetic acid is preferred. The anion can be introduced into the catalyst compositions either in the form of a compound from which the desired anion splits off or in the form of a mixture of compounds from which the desired anion is formed by mutual reaction. As a rule, the anion is incorporated in the catalyst compositions in the form of an acid. If desired, the anion can also be incorporated in the catalyst compositions in the form of a main group metal salt of a non-noble transition metal salt of the acid in question. If an anion of a carboxylic acid is chosen, its incorporation in the catalyst compositions can take place in the form of the acid or in the form of a derivative thereof, such as an alkyl or aryl ester, an amide, an imide, an anhydride, an ortho-ester, a lactone, a lactam or an alkylidene dicarboxylate. The anion is preferably present in the catalyst compositions in a quantity of 1-100 and in particular 2-50 mole per g.atom Group VIII metal. In addition to its introduction as a separate component, the anion of an acid with a pKa of less than 4 can also be present in the catalyst compositions by the use of, for example, palladium trifluoroacetate or palladium para-tosylate as the Group VIII metal compound.

In addition to a Group VIII metal, a diphosphorus compound and optionally an anion of an acid with a pKa of less than 4, the catalyst compositions according to the invention can also contain an organic oxidizing agent. Examples of suitable organic oxidizing agents are 1,2- and 1,4-quinones, aliphatic nitrites such as butyl nitrite and aromatic nitro compounds such as nitrobenzene and 2,4-dinitrotoluene. 1,4-benzoquinone and 1,4-naphthoquinone are preferred. The quantity of organic oxidizing agent employed is preferably 5-5000 and in particular 10-1000 mole per g.atom Group VIII metal.

In the catalyst compositions according to the invention the diphosphorus compound is preferably present in a quantity of 0.5-2 and in particular 0.75-1.5 mole per g.atom Group VIII metal. In the diphosphorus compound with the general formula X-R-X, the bridging group R should contain in the bridge connecting the two phosphorus atoms with each other, three or four atoms, of which at least two of the atoms are carbon atoms. Examples of very suitable bridging groups are the $-CH_2-CH_2-CH_2-$ group and the $-CH_2-CH_2-CH_2-CH_2-$ group. In the diphosphorus compound with the general formula X-R-X, group X represents a phosphacyclohexyl group which is connected via the phosphorus atom to a carbon atom of the bridging group R. One or more of the five carbon atoms, which together with the phosphorus atom form part of the phosphacyclohexyl group, can contain substituents. These can be either polar or non-polar substituents. Examples of non-polar substituents are alkyl groups such as methyl groups. Examples of polar substituents are hydroxyl group and oxo groups. In principle, each of the carbon atoms of the phosphacyclohexyl group is available for substitution. There is preference for a mono-substitution at the 3rd or 4th position relative to the phosphorus atom or a di-substitution at the 3rd and 4th positions or at the 3rd and 5th positions relative to the phosphorus atom. Very favourable results were obtained by using catalyst compositions according to the invention which contained a diphosphorus compound in which an oxo group was present in the phosphacyclohexyl groups at the 4th position relative to the phosphorus atom. Examples of such diphosphorus compounds are 1,3-P,P'-bis(4-oxo-phosphacyclohexyl)propane and 1,4-P,P'-bis(4-oxo-phosphacyclohexyl)butane. These two diphosphorus compounds are novel. They were prepared by reacting 1,3-diiodopropane and 1,4-diiodobutane respectively with tris(cyanoethyl)phosphine, then with sodium methoxide, then with potassium tertiary butoxide and finally with hydrochloric acid.

The polymerization using the catalyst compositions according to the invention is preferably carried out by contacting the monomers with a solution of the catalyst composition in a diluent in which the polymers are insoluble or almost insoluble. Lower alcohols such as methanol are very suitable as diluent. If desired, the polymerization can also be carried out in the gas phase. Suitable olefinically unsaturated monomers for use as starting materials in the process of the invention include compounds which consist solely of carbon and hydrogen as well as compounds which in addition to carbon and hydrogen also contain one or more heteroatoms. The catalyst compositions according to the invention are preferably used for the preparation of polymers of carbon monoxide with one or more olefinically unsaturated hydrocarbons. Examples of suitable hydrocarbon monomers are ethene and α-olefins such as propene, butene-1, hexene-1 and octene-1, styrene, norbornene and dicyclopentadiene. The catalyst compositions according to the invention are especially suitable for use in the preparation of copolymers of carbon monoxide with ethene or with propene and in the preparation of terpolymers of carbon monoxide with ethene and with propene;.

The quantity of catalyst composition used in the preparation of the polymers can vary within wide limits. A quantity of catalyst composition is preferably used which contains $10^{-7}$ to $10^{-3}$ and in particular $10^{-6}$ to $10^{-4}$ g.atom Group VIII metal per mole of olefinically unsaturated compound to be polymerized.

The preparation of the polymers is preferably carried out at a temperature of 25° to 150° C. and a pressure of 2 to 150 bar and in particular at a temperature of 30° to 130° C. and a pressure of 5 to 100 bar.

The ranges and limitations provided in the instant specification and claims are those which are believed to particularly point out and distinctly claim the instant invention. It is, however, understood that other ranges and limitations that perform substantially the same function in substantially the same way to obtain substantially the same results are intended to be within the scope of the instant invention as defined by the instant specification and claims.

The invention will be described by the following examples which are provided for illustrative purposes and are not to be construed as limiting the invention.

EXAMPLE 1

A carbon monoxide/ethene copolymer was prepared as follows. Into a stirred autoclave with a volume of 100 ml from which air had been driven by purging with nitrogen, a catalyst solution was introduced consisting of:
40 ml methanol,
0.05 mmol palladium acetate,
0.055 mmol 1,3-P,P'-bis(4-oxo-phosphacyclohexyl)propane, and
0.1 mmol para-toluenesulphonic acid After forcing in a 1:1 carbon monoxide/ethene mixture to a pressure of 40 bar, the contents of the autoclave were heated to 90° C. During the polymerization the pressure was kept constant by forcing in a 1:1 carbon monoxide/ethene mixture. After 1 hour the polymerization was terminated by cooling the reaction mixture to room temperature and releasing the pressure. The polymer was filtered off, washed with methanol and dried. 2.9 g copolymer was obtained. The polymerization rate was 550 g copolymer/(g palladium.hour).

EXAMPLE 2

A carbon monoxide/ethene copolymer was prepared in substantially the same way as in example 1, but with the difference that the catalyst solution contained 1,4-P,P'-bis(4-oxo-phosphacyclohexyl)butane instead of 1,3-P,P'-bis(4-oxo-phosphacyclohexyl)propane.

1.6 g copolymer was obtained. The polymerization rate was 300 g copolymer/(g palladium.hour).

EXAMPLE 3

A carbon monoxide/ethene/propene terpolymer was prepared as follows. Into a stirred autoclave with a volume of 100 ml from which air had been driven by purging with nitrogen, a catalyst solution was introduced consisting of:
40 ml methanol,
0.055 mmol 1,3-P,P'-bis(4-oxo-phosphacyclohexyl)propane, and
0.1 mmol para-toluenesulphonic acid.

After adding 9.8 g propene, the temperature was raised to 90° C., after which a 1:1 carbon monoxide/ethene mixture was forced in until a pressure of 40 bar was reached. During the polymerization the pressure was kept constant by forcing in a 1:1 carbon monoxide/ethene mixture. After 1 hour the polymerization was terminated by cooling the reaction mixture to room temperature and releasing the pressure. The polymer was filtered off, washed with methanol and dried. 1.2 g terpolymer was obtained. The polymerization rate was 230 g terpolymer/(g palladium.hour).

EXAMPLE 4

A carbon monoxide/ethene/propene terpolymer was prepared in substantially the same was as in example 3, but with the difference that the gas mixture was forced in to a pressure of 55 bar instead of 40 bar. 2.8 g terpolymer was obtained. The polymerization rate was 520 g terpolymer/(g palladium.hour).

EXAMPLE 5

A carbon monoxide/ethene/propene terpolymer was prepared in substantially the same was as in example 3, but with the following differences:
a) the catalyst solution contained 1,4-P,P'-bis(4-oxo-phosphacyclohexyl)butane instead of 1,3-P,P'-bis(4-oxophosphacyclohexyl)propane, and
b) 10.1 g propene was introduced into the autoclave instead of 9.8 g.

5.2 g terpolymer was obtained. The polymerization rate was 970 g terpolymer/(g palladium.hour).

EXAMPLE 6

A carbon monoxide/ethene/propene terpolymer was prepared in substantially the same was as in Example 3, but with the following differences:
a) the catalyst solution contained 1,4-P,P'-bis(4-oxo-phosphacyclohexyl)butane instead of 1,3-P,P'-bis(4-oxo-phosphacyclohexyl)propane,
b) 1.5 g propene was introduced into the autoclave instead of 9.8 g, and
c) the gas mixture was forced in until a pressure of 55 bar was obtained instead of 40 bar.

10.7 g terpolymer was obtained. The polymerization rate was 2000 g terpolymer/(g palladium.hour).

EXAMPLE 7

A carbon monoxide/propene copolymer was prepared as follows. Into a stirred autoclave with a volume of 100 ml from which air had been driven by purging with nitrogen a catalyst solution was introduced consisting of:
40 ml methanol,
0.05 mmol palladium acetate,
0.055 mol 1,3-P,P'-bis(4-oxo-phosphacyclohexyl)propane, and
0.1 mmol paratoluenesulphonic acid.

After adding 9.0 g propene, the temperature was raised to 60° C., after which carbon monoxide was forced in until a pressure of 40 bar was reached. During the polymerization the pressure was kept constant by forcing in carbon monoxide. After 17.3 hours the polymerization was terminated by cooling the reaction mixture to room temperature and releasing the pressure. The polymer was isolated by evaporating down the reaction mixture. 2.2 g copolymer was obtained. The polymerization rate was 25 g copolymer/(g palladium.hour).

EXAMPLE 8

A carbon monoxide/propene copolymer was prepared in substantially the same way as in example 7, but with the following differences:
a) the catalyst solution contained 1,4-P,P'-bis(4-oxo-phosphacyclohexyl)butane instead of 1,3-P,P'-bis(4-oxo-phosphacyclohexyl)-propane,
b) 13.8 g propene was introduced into the autoclave instead of 9.0 g, and
c) the reaction time was 3 hours instead of 17.3 hours.

2.4 g copolymer was obtained. The polymerization rate was 150 g copolymer/(g palladium.hour).

Examples 1–8 are according to the invention. In these examples polymers of carbon monoxide with ethene and/or with propene were prepared using catalyst compositions containing a Group VIII metal and a diphosphorus compound with the general formula X-R-X.

Comparison of the results of examples 1 and 2 shows the decrease in polymerization rate that occurs in the preparation of carbon monoxide/ethene copolymers if in the catalyst composition a diphosphorus compound with three atoms in the bridge is replaced by a diphosphorus compound with four atoms in the bridge. Comparison of the results of examples 3, 4 and 7 with those of examples 5, 6 and 8 respectively shows the increase in polymerization rate which occurs in the preparation of carbon monoxide/propene copolymers and carbon monoxide/ethene/propene terpolymers if in the catalyst composition a diphosphorus compound with three atoms in the bridge is replaced by a diphosphorus compound with four atoms in the bridge.

A strikingly high polymerization rate was obtained in example 5 in the preparation of carbon monoxide/ethene/propene terpolymers using a catalyst composition containing a diphosphorus compound with four atoms in the bridge in comparison with the polymerization rates obtained in examples 2 and 8 with the same catalyst composition in the preparation of carbon monoxide/ethene and carbon monoxide/propene copolymers respectively.

It was established by $^{13}$C-NMR analysis that the polymers prepared according to examples 1-8 were built up of linear chains in which the units from carbon monoxide on the one hand and the units from the olefins used on the other hand were present in an alternating arrangement. In the terpolymer chains the units from ethene and propene were present in a random distribution.

What is claimed is:

1. A novel catalyst composition, wherein the catalyst composition comprises a Group VIII metal compound and a diphosphorus compound of the general formula X-R-X in which R is a divalent organic bridging group containing three or four atoms, of which at least two are carbon atoms, which connects the two phosphorus atoms present in the diphosphorus compound with each other and in which X represents a phosphacyclohexyl group which is connected via the phosphorus atom to a carbon atom of the bridging group R.

2. A catalyst composition according to claim 1, wherein the catalyst composition contains palladium as Group VIII metal compound.

3. A catalyst composition according to claim 1, wherein Group VIII metal compound is incorporated in the form of a salt of a carboxylic acid.

4. A catalyst composition according to claim 1, wherein the catalyst composition additionally contains an anion of an acid with a pKa of less than 4.

5. A catalyst composition according to claim 4, wherein the catalyst composition contains an anion of an acid with a pKa of less than 2.

6. A catalyst composition according to claim 5, wherein the acid is sulphonic acid or a halocarboxylic acid.

7. A catalyst composition according to claim 4, wherein the catalyst composition contains the anion of an acid with a pKa of less than 4 in a quantity of 1 to 100 moles per g.atom of the group VIII metal compound.

8. A catalyst composition according to claim 7, wherein the catalyst composition contains the anion of an acid with a pKa of less than 4 in a quantity of 2 to 50 moles per g.atom of the Group VIII metal compound.

9. A catalyst composition according to claim 1, wherein the catalyst composition additionally contains an organic oxidizing agent.

10. A catalyst composition according to claim 9, wherein the organic oxidizing agent is a 1,4-quinone.

11. A catalyst composition according to claim 9, wherein the organic oxidizing agent is present in a quantity of 5 to 5000 moles per g.atom of the Group VIII metal compound.

12. A catalyst composition according to claim 11, wherein the organic oxidizing agent is present in a quantity of 10 to 1000 moles per g.atom of the Group VIII metal compound.

13. A catalyst composition according to claim 1, wherein the diphosphorus compound is present in a quantity of 0.5 to 2 moles per g.atom of the Group VIII metal compound.

14. A catalyst composition according to claim 13, wherein the diphosphorus compound is present in a quantity of 0.75 to 1.5 moles per g.atom of the Group VIII metal compound.

15. A catalyst composition according to claim 1, wherein the bridging group R is a —CH$_2$—CH$_2$—CH$_2$— group or a —CH$_2$—CH$_2$—CH$_2$—CH$_2$— group.

16. A catalyst composition according to claim 1, wherein the diphosphorus compound is one in which an oxo group occurs as a substituent in the phosphacyclohexyl groups at the 4th position relative to the phosphorus atom.

17. A catalyst composition according to claim 1, wherein the diphosphorus compound is 1,3-P,P'-bis(4-oxo-phosphacyclohexyl) propane or 1,4-P,P'-bis(4-oxo-phosphacyclohexyl)butane.

* * * * *